(12) United States Patent
Petrovic

(10) Patent No.: US 11,036,270 B2
(45) Date of Patent: Jun. 15, 2021

(54) METHOD AND APPARATUS FOR PROVIDING STANDBY POWER TO AN INTEGRATED CIRCUIT

(71) Applicant: Entropie Communications, LLC., Carlsbad, CA (US)

(72) Inventor: Branislav Petrovic, La Jolla, CA (US)

(73) Assignee: Entropic Communications, LLC, Carlsbad, CA (US)

( * ) Notice: Subject to any disclaimer, the term of this patent is extended or adjusted under 35 U.S.C. 154(b) by 0 days.

(21) Appl. No.: 16/209,809

(22) Filed: Dec. 4, 2018

(65) Prior Publication Data
US 2019/0179388 A1 Jun. 13, 2019

Related U.S. Application Data

(63) Continuation of application No. 14/292,321, filed on May 30, 2014, now Pat. No. 10,146,284.

(60) Provisional application No. 62/000,894, filed on May 20, 2014.

(51) Int. Cl.
*G06F 1/26* (2006.01)
*G06F 1/32* (2019.01)
*G06F 1/3287* (2019.01)

(52) U.S. Cl.
CPC ............ *G06F 1/263* (2013.01); *G06F 1/3287* (2013.01); *Y02D 10/00* (2018.01); *Y02D 30/50* (2020.08)

(58) Field of Classification Search
None
See application file for complete search history.

(56) References Cited

U.S. PATENT DOCUMENTS

| | | | | |
|---|---|---|---|---|
| 6,523,128 B1* | 2/2003 | Stapleton | ............... | G06F 1/3203 713/324 |
| 6,804,591 B1* | 10/2004 | Miyazawa | ............ | G06F 1/3203 701/36 |
| 8,037,330 B2 | 10/2011 | Livescu | | |
| 8,429,432 B2* | 4/2013 | Matula | .................... | G06F 1/266 713/300 |
| 8,766,707 B1* | 7/2014 | Younger | ................ | G06F 1/3287 327/534 |
| 8,812,885 B2 | 8/2014 | Royannez | | |
| 2001/0007134 A1 | 7/2001 | Odaohhara | | |
| 2005/0064829 A1* | 3/2005 | Kang | ................... | H04W 52/028 455/127.1 |
| 2007/0177320 A1* | 8/2007 | Tokumaru | ................. | G06F 1/26 361/90 |
| 2008/0065920 A1 | 3/2008 | Suginaka | | |

(Continued)

*Primary Examiner* — Jaweed A Abbaszadeh
*Assistant Examiner* — Cheri L Harrington
(74) *Attorney, Agent, or Firm* — McAndrews, Held & Malloy, Ltd.

(57) ABSTRACT

Systems and methods for providing power to a home entertainment integrated circuit chip are disclosed. The home entertainment integrated circuit chip can operate in at least two power control modes: "power on" mode and "standby" mode. In power on mode, power is supplied to IC core module from a main power supply. The power supplied to the IC core module is isolated from power supplied to a standby island. Accordingly, during the second mode power is applied only to the standby power island through a regulator internal to the integrated circuit chip. The regulator is coupled to an external peripheral input/output (I/O) power supply that is independent of the main power supply.

7 Claims, 4 Drawing Sheets

(56) References Cited

U.S. PATENT DOCUMENTS

| | | |
|---|---|---|
| 2008/0086650 A1 | 4/2008 | Ozawa |
| 2008/0316367 A1* | 12/2008 | Vasella ................ H04N 5/63 348/706 |
| 2009/0172453 A1 | 7/2009 | Dishman |
| 2009/0196115 A1 | 8/2009 | Agari |
| 2009/0201082 A1 | 8/2009 | Smith |
| 2009/0287947 A1 | 11/2009 | DuBose |
| 2011/0298279 A1 | 12/2011 | Dimrco |
| 2012/0042187 A1 | 2/2012 | Morimura |
| 2012/0228937 A1 | 9/2012 | Massand |
| 2013/0067259 A1* | 3/2013 | Freiwald ............. G06F 1/3293 713/323 |
| 2013/0088079 A1 | 4/2013 | Kim |
| 2013/0148247 A1 | 6/2013 | Zhao |
| 2013/0212418 A1 | 8/2013 | Ueda |
| 2013/0328615 A1 | 12/2013 | Sano |
| 2014/0013135 A1 | 1/2014 | Matos |
| 2014/0252861 A1 | 9/2014 | Zhou |
| 2015/0005976 A1 | 1/2015 | Akebono |
| 2015/0036446 A1* | 2/2015 | Kenkare ................ H02J 1/00 365/226 |
| 2015/0091829 A1 | 4/2015 | Endo |
| 2015/0106638 A1 | 4/2015 | Sun |
| 2015/0134990 A1 | 5/2015 | Masuda |
| 2015/0249751 A1 | 9/2015 | Suga |
| 2015/0277530 A1* | 10/2015 | Rathnakar ............. G06F 1/324 713/322 |
| 2016/0359358 A1 | 12/2016 | Jeong |

\* cited by examiner

METHOD AND APPARATUS FOR PROVIDING STANDBY POWER TO AN INTEGRATED CIRCUIT

RELATED APPLICATIONS

This application claims priority benefit of U.S. Provisional Patent Application Ser. No. 62/000,894, filed May 20, 2014 and entitled "Method and Apparatus for Providing Standby Power to an Integrated Circuit", which is herein incorporated by reference in its entirety.

TECHNICAL FIELD

The disclosed method and apparatus relate to providing low power modes in an integrated circuit more particularly to providing integrated standby power within an integrated circuit.

BACKGROUND

Integrated circuits are ubiquitous today. They are used for a very diverse set of consumer electronics, military electronics and commercial electronics. One concern that is becoming common to all devices that employ integrated circuits is the need to reduce the amount of power consumed. One way to reduce power consumption in a device is to turn off portions of the device that are not required at particular times (i.e., limit functionality, or remove power). In many cases, it is desirable to maintain power to other portions of the device in order to allow a user to quickly access the functions of the device.

FIG. 1 is a simplified block diagram of system 100. The system 100 can operate in either a "power on" mode or a "standby" mode. A peripheral input/output (I/O) power supply 101 supplies power to one or more I/O devices 103. This power is always provided. The I/O devices 103 may include such things as an infra-red detector for receiving inputs from a infra-red emitting remote control device, such as a television or set top box remote control. Other such I/O devices include: (1) receivers for Multimedia over Coax Alliance (MoCA) commands received over an interface that operates in accordance with the well-known MoCA standard for communications over coaxial cable; (2) front panel controls; (3) Ethernet receivers; (4) radio frequency (RF) receivers; or (5) local area network (LAN) receivers. By ensuring that power is always supplied to the I/O devices, such I/O devices remain functional and thus allow commands to be received to move the system 100 from standby mode to power on mode.

A relatively larger external main power supply 102 is connected to a standby island 104 within an integrated circuit 106. The external power supply is also connected to a switch 108 that allows power to be connected to a core 110 of the integrated circuit 106 when in the system 100 is in power on mode or, alternatively, to the standby island 104 within the integrated circuit 106 during standby mode. The core 110 essentially includes all of the circuitry of the integrated circuit 106 that is not within the standby island 104. The core power requirement is much greater than that of the standby island 104. In some instances, the core 110 may draw as much as 4 Amps. However, the core 110 can be powered down during standby mode. Therefore, the switch 108 has to be capable of handling relatively high current with a minimal voltage drop. This requires the switch 108 to have a very low "on-resistance". Such switches are difficult to integrate into the integrated circuit 106. The result is that the system cost is increased due to the expense of the external switch (typically a large field effect transistor).

Accordingly, there is presently a need for a low cost means for switching from power mode to standby mode.

SUMMARY

Various embodiments of methods and structures are disclosed for reducing the cost of a system that has both power on mode and standby mode. Some of these embodiments are directed toward systems and methods for using an internal regulator that taps power from an external peripheral I/O power supply. The regulated power is supplied to a standby island that is isolated from an integrated circuit (IC) core module, allowing power to flow to the standby island when power is concurrently not being applied to the IC core module. A control output from the standby island allows a power supply control module within the standby power supply to turn an external main power supply on and off to remove power from the IC core module.

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

Figure 1:
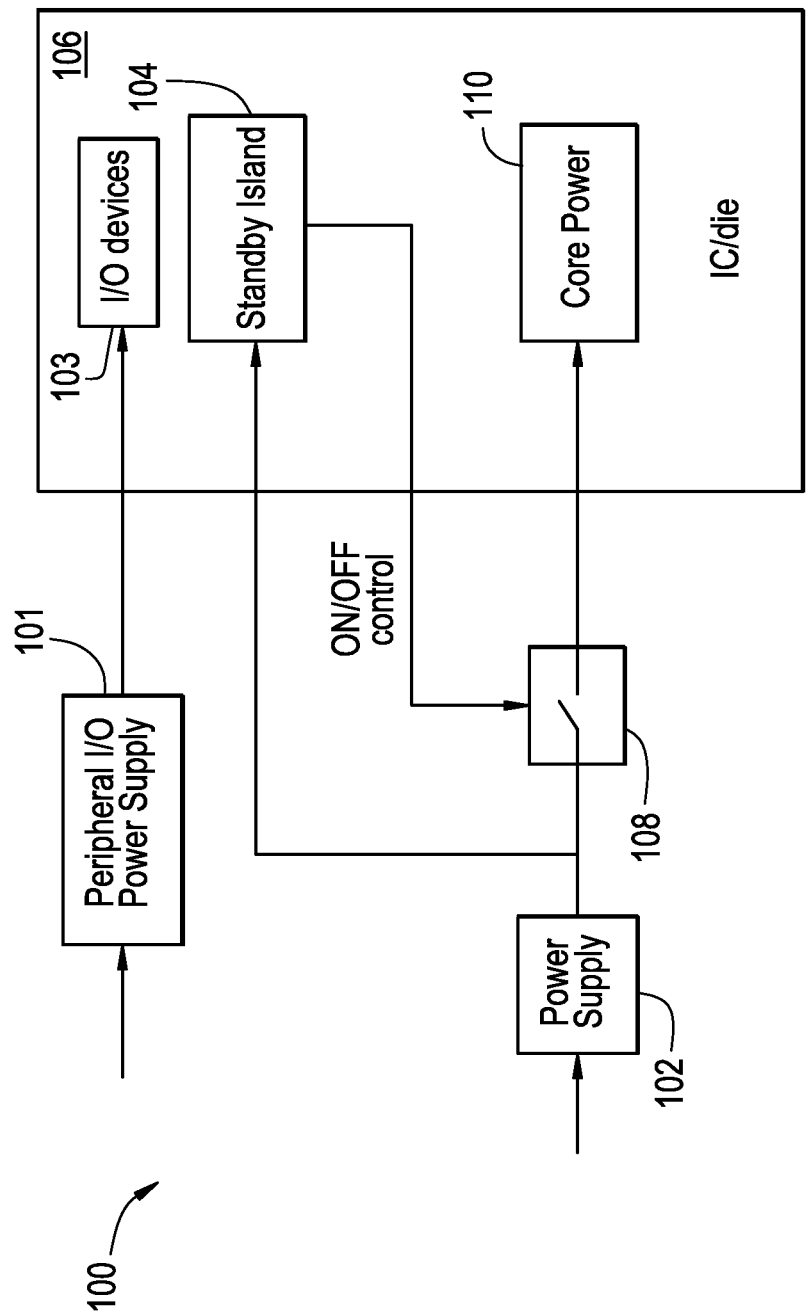
FIG. 1 is a simplified block diagram of a prior art system having both standby mode and power on mode.
Figure 2:
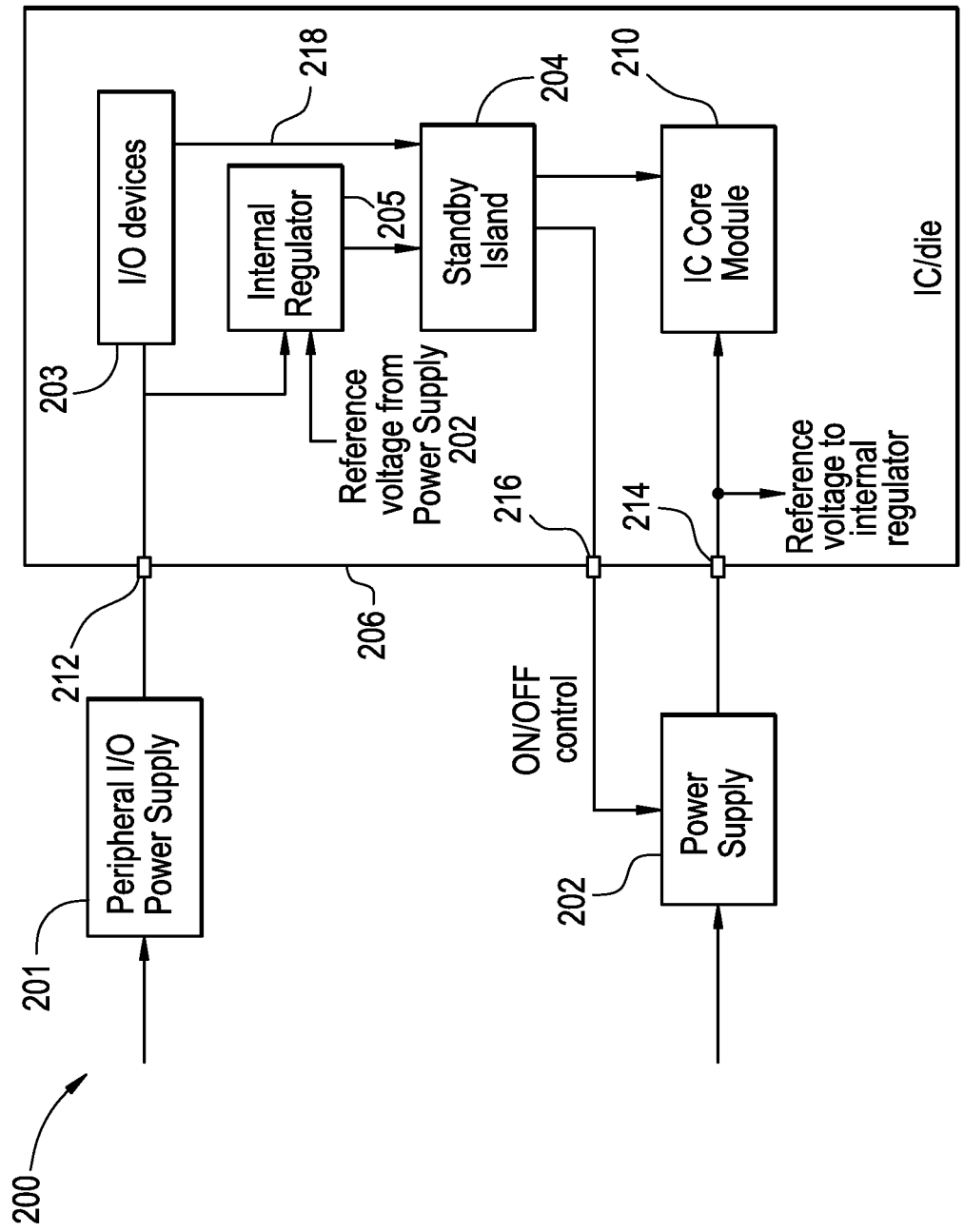
FIG. 2 is a simplified block diagram of a system in accordance with one embodiment of the disclosed method and apparatus for reducing the cost of switching between power on mode and standby mode.

FIG. 2 is a simplified block diagram of a system 200 in accordance with one embodiment of the disclosed method and apparatus. The system 200 includes a peripheral input/output (I/O) power supply 201, a relatively large external main power supply 202 and an integrated circuit 206. The integrated circuit 206 includes one or more I/O devices 203; a standby island 204; an internal regulator 205; IC core module 210 within the integrated circuit 206; a peripheral I/O power supply output connection point 212; a main power supply output connection point 214; and a main power supply control connection point 216. In accordance with one embodiment of the disclosed method and apparatus, the connection points 212, 214, 216 are pins of a ball grid array. Alternatively, the connection points 212, 214, 216 are pins of a pin grid array. However, it will be understood by those skilled in the art that there are many ways in which a connection can be made between conductors within the integrated circuit 206 and devices, components, circuits and the like external to the integrated circuit 206. Any such way can be used.

The standby island is defined as that circuitry associated with (i.e., powered by) a standby island power rail. The IC core module is defined as that circuitry associated with (i.e., powered by) an IC core module power rail. The standby island power rail is isolated from the IC core module power rail. For the purposes of this disclosure, a power rail is defined as that set of conductors that are used to distribute power to circuits within an integrated circuit.

The internal regulator 205 provides regulated power to a standby island 204 within the integrated circuit 206 through the peripheral I/O power supply output connection point 212. The standby island 204 includes all of the circuitry to which power should remain applied during standby mode. The power provided to the standby island 204 is isolated from the power that is provided to the IC core module 210 of the integrated circuit 206 by the larger power supply 202. Due to the isolation of the standby island 204 from the IC core module 210, power can be independently applied to and removed from the IC core module 210 and the standby island 204. Accordingly, during standby mode, power is applied to the standby island 204 and removed from the IC core module 210.

The peripheral I/O power supply 201 continues to supply power during standby mode, since the I/O devices need to be functional during standby mode in order to receive commands that might be provided by a user to remove the system 200 from standby mode. The internal regulator 205 is powered by the power supplied through the peripheral I/O power supply output connection point 212. The internal regulator 205 provides a steady, clean power source to the standby island 204 with varying load conditions.

The standby island outputs a power control signal that is coupled through the main power supply control connection point 216 to a control input on the main power supply 202. The main power supply 202 provides power to the IC core module 210 through the main power supply output connection point 214. The I/O devices 203 output signals 218 to the standby island to allow a user to command the standby island to exit standby mode. In one embodiment, the I/O devices 203 reside outside the integrated circuit 206. However, I/O drivers are provided on the integrated circuit 206. In yet another alternative embodiment, the I/O devices and their drivers are outside the integrated circuit 206.

Figure 3:
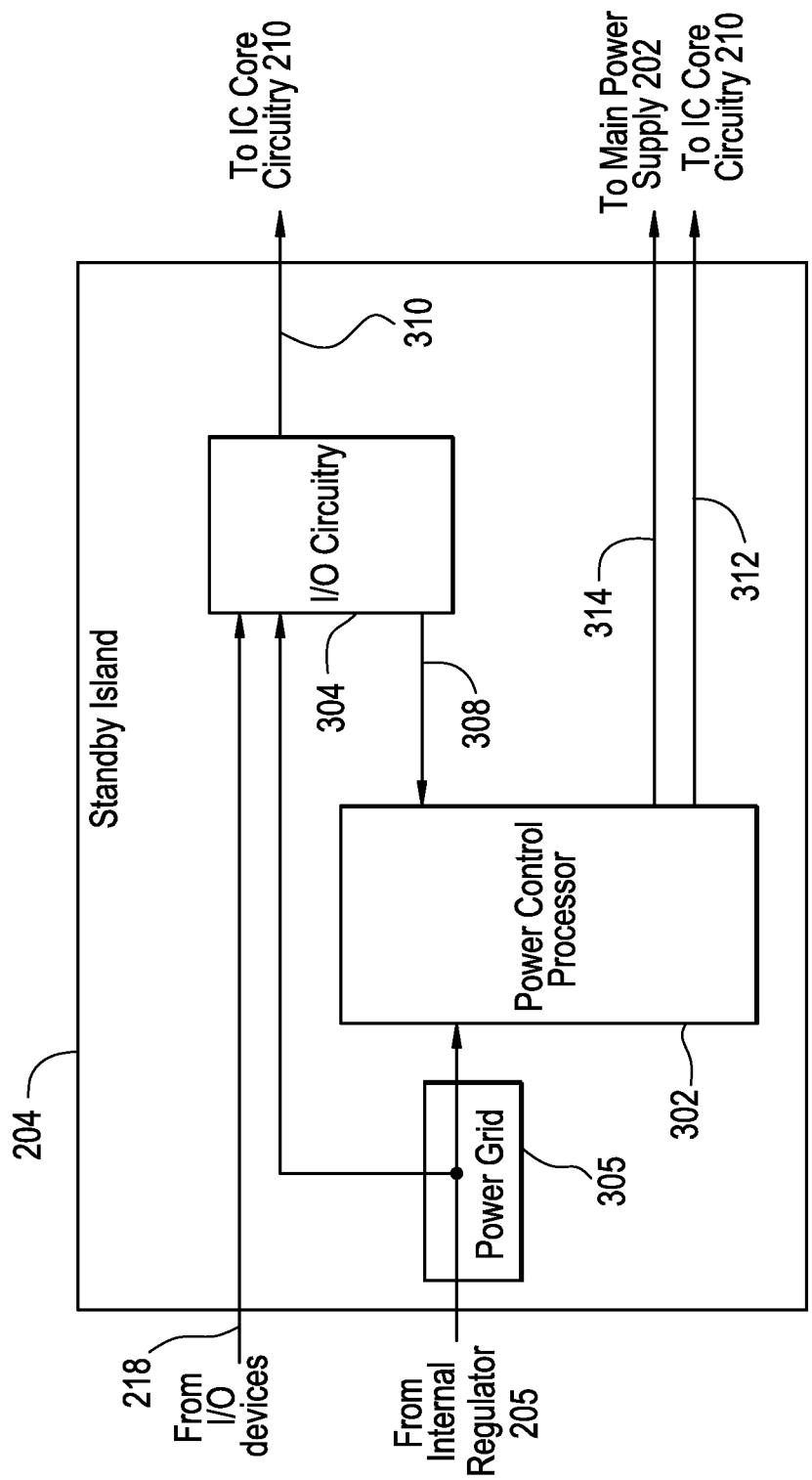
FIG. 3 is a simplified block diagram of a standby island in accordance with one embodiment of the disclosed method and apparatus.

FIG. 3 is a simplified block diagram of the standby island 204. The standby island 204 includes a power control processor 302 and I/O circuitry 304. The I/O circuitry 304 provides a means for external inputs 218 to command the system 200. Such commands may originate at front panel switches and buttons (not shown) that allow a user to turn power on and off, and otherwise execute functions of the system 200. Alternatively, the commands may come from external sources, such as Ethernet, LAN, infra-red sources, MoCA networks, etc. The I/O circuitry 304 will receive these inputs 218 and, in some cases, provide a signal 308 to the power control processor 302 to exit standby mode. In other cases, the commands may be received during power on mode. In this case, the I/O circuitry 304 may output signals 310 directly to the IC core module 210 to cause a function to be executed by the IC core module 210. For example, in the case in which the system 200 is a set top box, commands such as channel selection, fast forward, etc. may be communicated directly from the I/O circuitry 304 to the IC core module 210.

The power control processor 302 provides control signals 312 to various circuits within the IC core module 210. Some of these controls signals 312 allow the power control processor 302 to slow clocks within the IC core module 210 in order to reduce power consumption. Other signals 312 allow the power control processor 302 to completely disable functions performed within the IC core module 210 to reduce power consumption.

The power control processor 302 also outputs a signal 314 to the main power supply 202 that will cause the main power supply 202 to shut down. In one embodiment, the signal 314 is coupled to a power control input port on the main power supply 202 that allows external control of the main power supply 202. Alternatively, the signal 314 is coupled to a feedback control loop input on the main power supply 202. The feedback control loop input allows an external source to raise or lower the output of the main power supply 202. Typically, the feedback control loop input is coupled to the output of the power supply to regulate the voltage output from the main power supply 202. However, in accordance with one embodiment of the presently disclosed method and apparatus, by applying a signal 314 to the main power supply feedback control loop port that is above the desired output voltage, the power control processor 302 can drive the main power supply output voltage to zero.

In accordance with one embodiment, the internal regulator 205 must provide sufficient regulation to ensure that the voltage applied to the standby island 204 during power on mode closely tracks the voltage applied to the IC core module 210 from the main power supply 202. This is desirable, since the signals communicated from the standby island 204 to the IC core module 210 will require a common reference. In accordance with one embodiment, the regulator 205 uses the main power supply voltage as a reference to allow the regulator 205 to track the main power supply voltage. In one embodiment, the regulator 205 is a switched-capacitor regulator. It should be noted that since the regulator 205 is a relatively low power source, the efficiency of the overall system 200 may be greater than in systems which do not use an internal regulator powered from a discrete low power source, such as the peripheral I/O power supply 201.

As noted above, the system 200 can operate in either power on mode in which power is applied to the IC core module 210 by the main power supply 202 or in standby mode. In standby mode, the standby island 204 commands the main power supply 202 to shut down. Power remains applied to the standby island and I/O devices through the peripheral I/O power supply 201 and the internal regulator 205. It should be noted that the standby island 204 will stop using the main power supply output as a reference to the regulator 205 when in standby mode.

Figure 4:
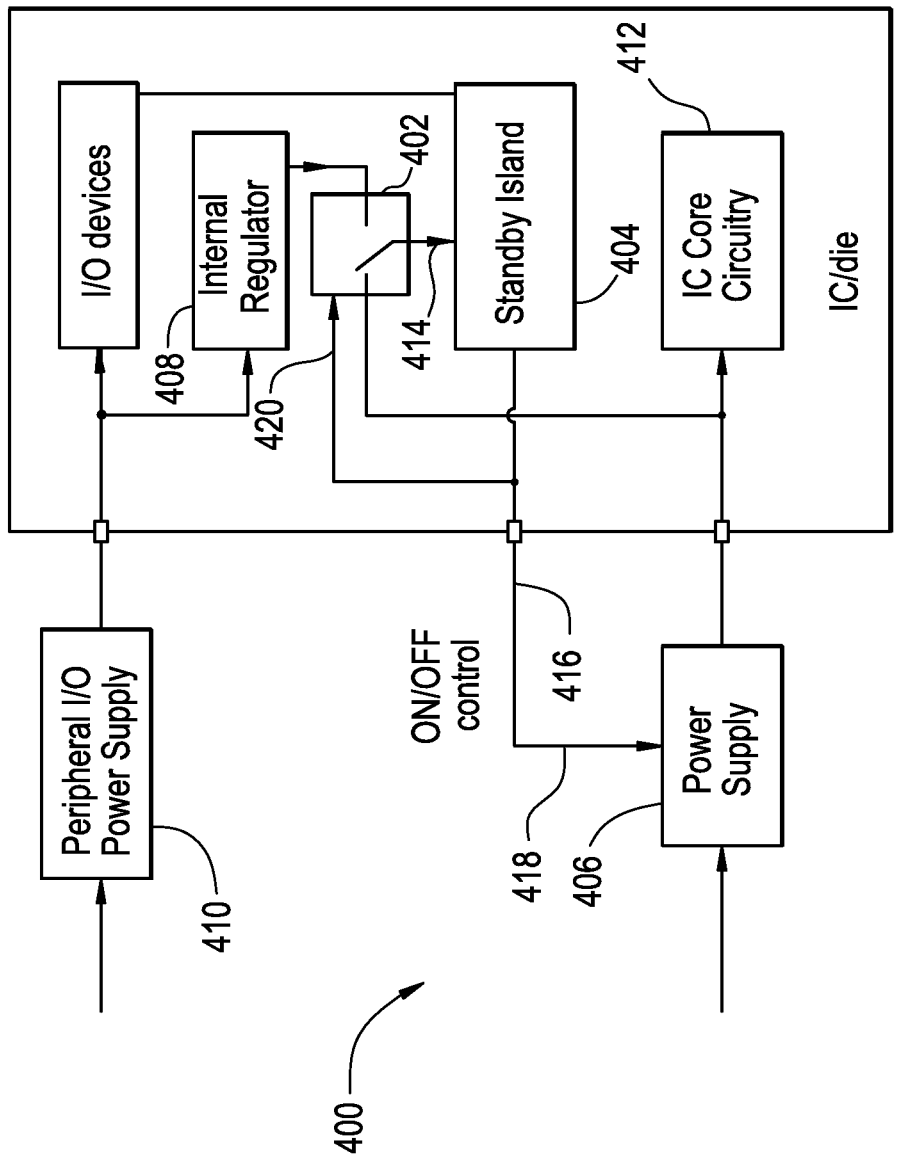
FIG. 4 is a simplified block diagram of an alternative system in which the source of power to a standby island is switched.

FIG. 4 is a simplified block diagram of an alternative system 400 in which the source of power to a standby island 404 is switched. An internal switch 402 is used to switch the source of power used by the standby island 404 in power on mode from the main power supply 406, to a regulator 408 powered by a peripheral I/O power supply 410, which is used in standby mode. Accordingly, during power on mode, the same power rail is used by both standby island 404 and IC core module 412. Since the same power rail is used, there is no need to track and match the power source applied to the standby island 404 to the power supply used by the IC core module 412. However, in order to ensure that power is continuously supplied to the standby island 404 during switch over from one power source to the other, a capacitor may be added at the standby island power input 414 to hold the voltage during the transition. The operation of the system 400 is essentially the same as that described with respect to the system 200 of FIG. 2, but for the use of the main power supply 406 during power on mode.

When the standby island 404 determines that it is appropriate to enter standby mode, a command signal is provided over a control line 416 from the standby island 404 to the main power supply 406. The command signal causes the main power supply to shut down (i.e., stop providing power to the IC core module 412). As was the case described above with regard to the system 200 of FIG. 2, the command signal can be provided to either an enable input 418 to the main power supply 406 or to a feedback control loop input. The command line 416 is also coupled to a control input port 420 on the switch 402.

Since the internal regulator 408 is not used during power on mode, the peripheral I/O power supply 410 can be disconnected from the regulator 408 during power on mode or power from the peripheral I/O power supply 410 otherwise disabled in order to improve the overall power efficiency of the system 400.

Although the disclosed method and apparatus is described above in terms of various embodiments and implementations, it should be understood that the various features, aspects and functionality described in one or more of the individual embodiments are not limited in their applicability to the particular embodiment with which they are described. Thus, the breadth and scope of the claimed invention should not be limited by any of the above-described embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described through the use of block diagrams, flow charts and other illustrations that illustrate examples of embodiments of the disclosed method and apparatus. As will become apparent to one of ordinary skill in the art after reading this document, the illustrated embodiments and their various alternatives can be implemented without confinement to the particular illustrated examples. For example, block diagrams and their accompanying description should not be construed as mandating a particular architecture or configuration.

What is claimed is:

1. An integrated circuit comprising:
  a first external power supply connection point that is configured to power one or more input/output (I/O) devices during a power-on mode and a standby mode;
  a regulator having an input and an output, the input being coupled to the first external power supply connection point, wherein the regulator and the one or more I/O devices are directly powered by an external peripheral I/O power supply via the first external power supply connection point during the power-on mode and the standby mode;
  a switch that is part of the integrated circuit, the switch having a first input, a second input, an output and a control port, the first input being coupled to the output of the regulator;
  a second external power supply connection point, the second external power supply connection point being coupled to the second input of the switch;
  a main power supply control connection point;
  a standby island having a control output port, and a power grid, the control output port being coupled to the main power supply control connection point and to the control port of the switch; and
  a core module having a power grid that is isolated from the power grid of the standby island, the core module power grid being coupled to the second external power supply connection point,
  wherein the standby island comprises a power control processor having an output coupled to the control output port of the standby island, the power control processor providing a control signal to the switch to cause the switch to connect the first input of the switch to the output of the switch during a standby mode and to connect the second input of the switch to the output port of the switch during a power on mode, and
  wherein the power control processor has an input, and the standby island further comprises input/output circuitry having an output coupled to the input of the power control processor, the input/output circuitry outputting a signal to the power control processor, the power control processor causing the switch to connect the second power supply connection point to the output of the switch in response to the signal provided from the input/output circuitry, and
  wherein the input/output circuitry has an input coupled to at least one input/output device, the input/output circuitry outputting the signal to the power control processor in response to receiving a signal from at least one of the input/output devices.

2. The integrated circuit of claim 1, wherein the one or more I/O devices are configured to be powered during the standby mode, but not through the regulator that is coupled to the first external power supply connection point.

3. The integrated circuit of claim 1, wherein the first external power supply connection point and the second external power supply connection point are input points to the integrated circuit, wherein the main power supply control connection point is an output point from the integrated circuit, wherein the first external power supply connection point is configured to receive power from a first power supply that is external to the integrated circuit, wherein the second external power supply connection is configured to receive power from a second power supply that is external to the integrated circuit, and wherein the main power supply control connection point is configured to control the second power supply that is external to the integrated circuit.

4. A method for providing power to a device, the method comprising:
   selecting between operating in a power-on mode and a standby mode;
   receiving power from a first power supply when operating in the power-on mode, the power being provided to a standby island and to a core module;
   sending a command to turn off the first power supply in response to selecting to operate in standby mode;
   supplying power from a regulator to the standby island when operating in standby mode, the regulator receiving power from a second external power supply connection point; supplying power to one or more input/output (I/O) devices from the second external power supply connection point independent of the regulator that also receives power from the second external power supply connection point during the standby mode; and
   supplying power to the one or more I/O devices from the second external power supply connection point independent of the regulator that also receives power from the second external power supply connection point during the power-on mode, wherein the standby island comprises a power control processor having an output coupled to the control output port of the standby island, the power control processor providing a control signal to a switch to cause the switch to connect the first input of the switch to the output of the switch during the standby mode and to connect the second input of the switch to the output port of the switch during the power-on mode, and wherein the power control processor has an input, and the standby island further comprises input/output circuitry having an output coupled to the input of the power control processor, the input/output circuitry outputting a signal to the power control processor, the power control processor causing the switch to connect the second power supply connection point to the output of the switch in response to the signal provided from the input/output circuitry, and wherein the input/output circuitry has an input coupled to at least one input/output device, the input/output circuitry outputting the signal to the power control processor in response to receiving a signal from at least one of the input/output devices.

5. The method of claim 4, further comprising providing the control signal from the standby island to the switch for selecting between providing power from the first power supply to the standby island when operating in the power-on mode and providing power from the regulator to the standby island in the standby mode.

6. The method of claim 4, wherein a second power supply provides power to the at least one input/output device.

7. The method of claim 6, wherein the standby island provides a command to turn on the first power supply in response to the signal from the at least one of the input/output devices.

* * * * *